3,522,605
MTI RADAR LOW-POWER HARDENING

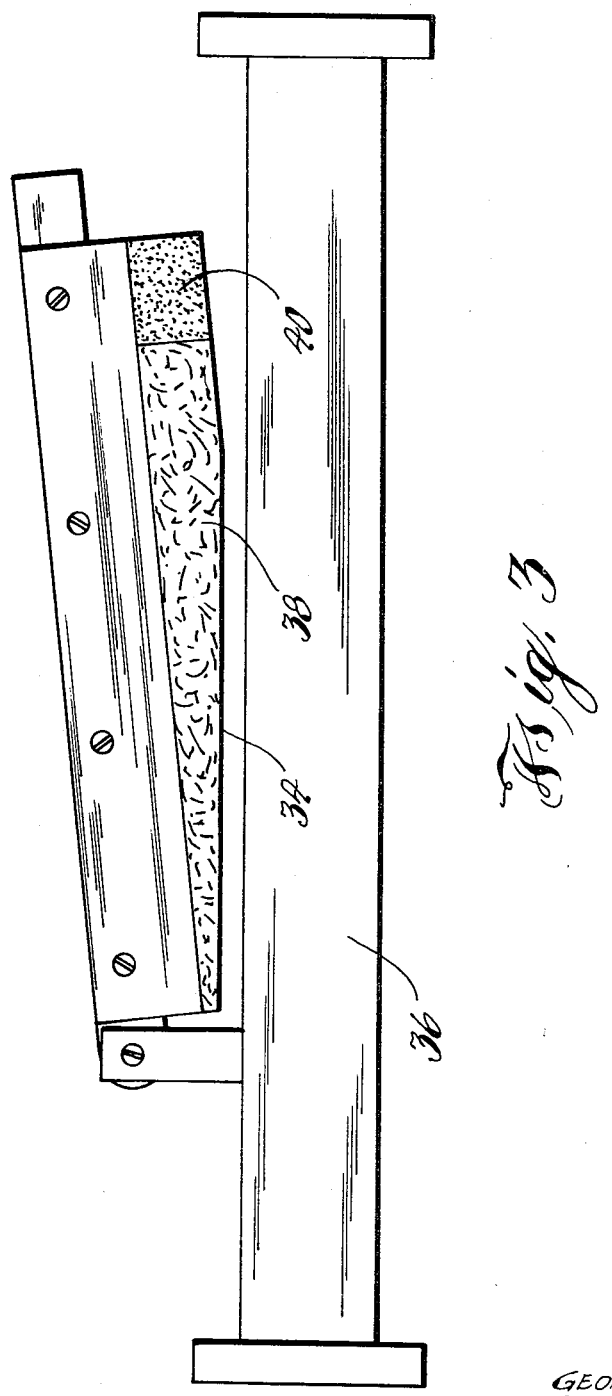

George E. Mader and Gerald W. Musgrove, Syracuse, and Bowen E. Simmons, Fayetteville, N.Y., assignors, by mesne assignments, to the United States of America as represented by the Secretary of the Navy
Filed Sept. 20, 1962, Ser. No. 225,950
Int. Cl. G01s 9/42
U.S. Cl. 343—18         2 Claims This invention relates to a method and means for low-power "hardening" of radar sets and especially to a method and means for the low-power "hardening" of Doppler-type, MTI sentry radars.

Sentry radars are small, lightweight radars, such as the AN/TPS-21 and AN/PPS-4, which are used by the military in battlefield situations to detect moving enemy personnel and vehicles. These radars detect moving targets by means of the Doppler effect.

Other electronic devices, called "listener" receivers, have been developed to nullify the sentry radars. The listener receiver is a portable electronic unit which is carried by an infiltrating soldier. It provides a warning signal when the soldier is being illuminated by the radiation beam of a sentry radar. When the warning is given, the soldier stops moving until the beam has passed. Since the sentry radar is a moving target indicator (MTI) radar, immobility of a target prevents its detection. Thus, the problem posed for the sentry radar is how to illuminate a soldier with a radar beam without activating his listener receiver.

Let us now define the least amount of power which the sentry radar must radiate to identify a slowly moving target, such as a man, at a given range as the "hardened" power of the sentry radar set, and the least amount of received radar power required to activate the listener receiver as the listener power. Let the maximum range of the radar be $R_R$ and the maximum range of the listener $R_L$. If $R_R > R_L$, then the radar is hardened against that listener over a hardened range increment $R_R - R_L$.

It has been found that, with most practical listener receivers and the sensitive sentry radars now in use, the hardened power at ranges $R_R$ up to 2000 to 6000 yards is below the listener power so that the listener receiver will provide no warning within the hardened range increment if a sentry radar illuminates its bearer with hardened power at less than 2000 to 6000 yards range.

Once the hardened power has been determined for a given sentry radar and listener receiver combination at a specific range, the hardened power at other ranges varies in proportion to the fourth power of the range. Thus, in a typical battlefield operation where the sentry radar ranges over wide areas, the transmitted power of the sentry radar must be varied in accordance with the fourth power of the range.

An object of the invention is to operate sentry radars in such a manner that they are not detected by listener radars within preselected ranges of operation.

Other objects and many of the attendant advantages of this invention will be readily appreciated as the same becomes better understood by reference to the following detailed description when considered in connection with the accompanying drawings wherein:

FIG. 3 is a representation of a variable waveguide attenuator which can be employed with this invention.

Figure 1:
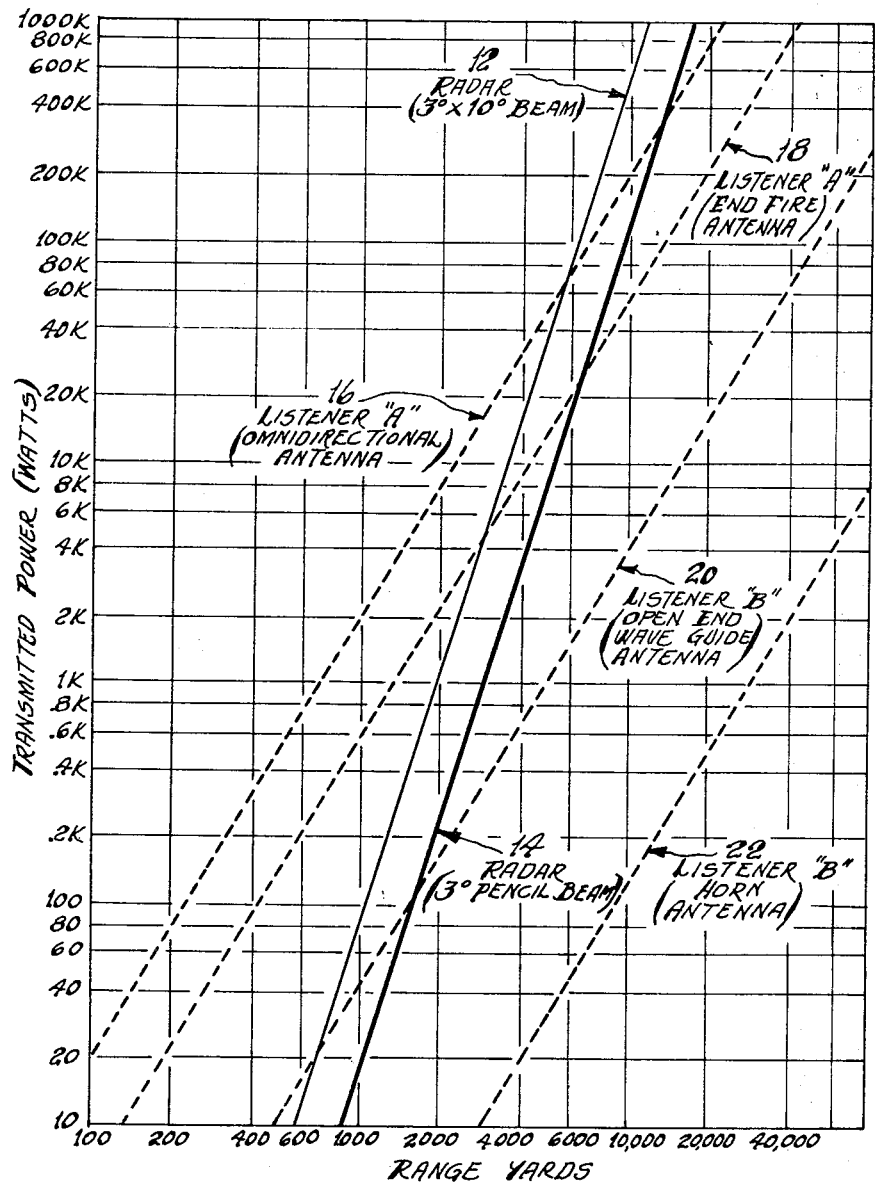
FIG. 1 is a graph showing the minimum transmitted radar power at each range needed for the radar to detect a slowly walking person, and the minimum received radar power at each range needed by several different listener receiver-antenna combinations to detect the radar beam.

FIG. 1 shows a plot of the minimum transmitted power needed at each range for a typical modern MTI sentry radar to detect a slowly walking interloper and the minimum received power needed for the interloper's listener to detect the radar beam. Curves are shown for a radar beamwidth of 3 by 10 degrees 12, a radar pencil beam of 3 degrees 14, listener "A" with an omnidirectional antenna 16, listener "A" with an end fire antenna 18, listener "B" with an open-end wave guide antenna 20 and listener "B" with a horn antenna 22.

Considering curves 14 and 18, it can be seen that for an MTI radar using a 3 degree pencil beam and listener "A" with an end fire antenna, there is a crossover point at a range of about 7000 yards. Below this range, the listener does not receive enough power to detect the radar beam but the radar can detect the interloper. For listener "B" with the open-end wave guide antenna 20, the crossover range (maximum range at which radar can detect interloper but interloper's listener cannot detect radar beam) is about 1700 yards. This distance is what has been called the hardened range increment $R_R - R_L$. If listener "B" with a horn antenna 22 is employed against this particular MTI radar, there is no possibility of hardening the radar. In this case, the sensitivity of the radar's receiver must be increased before the radar hardening technique can be used successfully.

Of course, it would theoretically be possible to further increase the sensitivity of the listener receiver to counter the increase in sensitivity of the radar receiver. In practice, however, the sensitivity of the listener device is limited by the amount of weight a moving soldier can carry effectively. It is difficult to build sensitive, low-noise receivers that are light, small and inexpensive.

Mathematically, the equations for $R_o$, the crossover detection range for radar and listener, and for $P_{to}$, the transmitted radar power appropriate to $R_o$ are:

$$R_o^2 = \frac{\sigma}{4\pi}\left[\frac{G}{P_{nR}}\right]\left[\frac{P_{nL}}{G_L}\right] \qquad \text{I}$$

$$P_{to} = \frac{(4\pi)^2}{G\lambda^2}\left[\frac{P_{nL}}{G_L}\right]\left[R_o^2 = \frac{4\pi\sigma}{P_{nR}\lambda^2}\right]^2 \qquad \text{II}$$

These equations are derivable from the conventional radar equation for the point-target reflected power received by the radar antenna ($S_R$) and from the equation for the radar beam power received by the antenna of a listener mounted on the moving target ($S_L$):

$$S_R = \frac{PG(\theta)}{4\pi R^2}\frac{\sigma}{4\pi R^2}\frac{G(\theta)\lambda^2}{4\pi} \qquad \text{III}$$

$$S_L = \frac{PG(\theta)}{4\pi R^2}\frac{G_L(\theta_L)\lambda^2}{4\pi} \qquad \text{IV}$$

Figure 2:
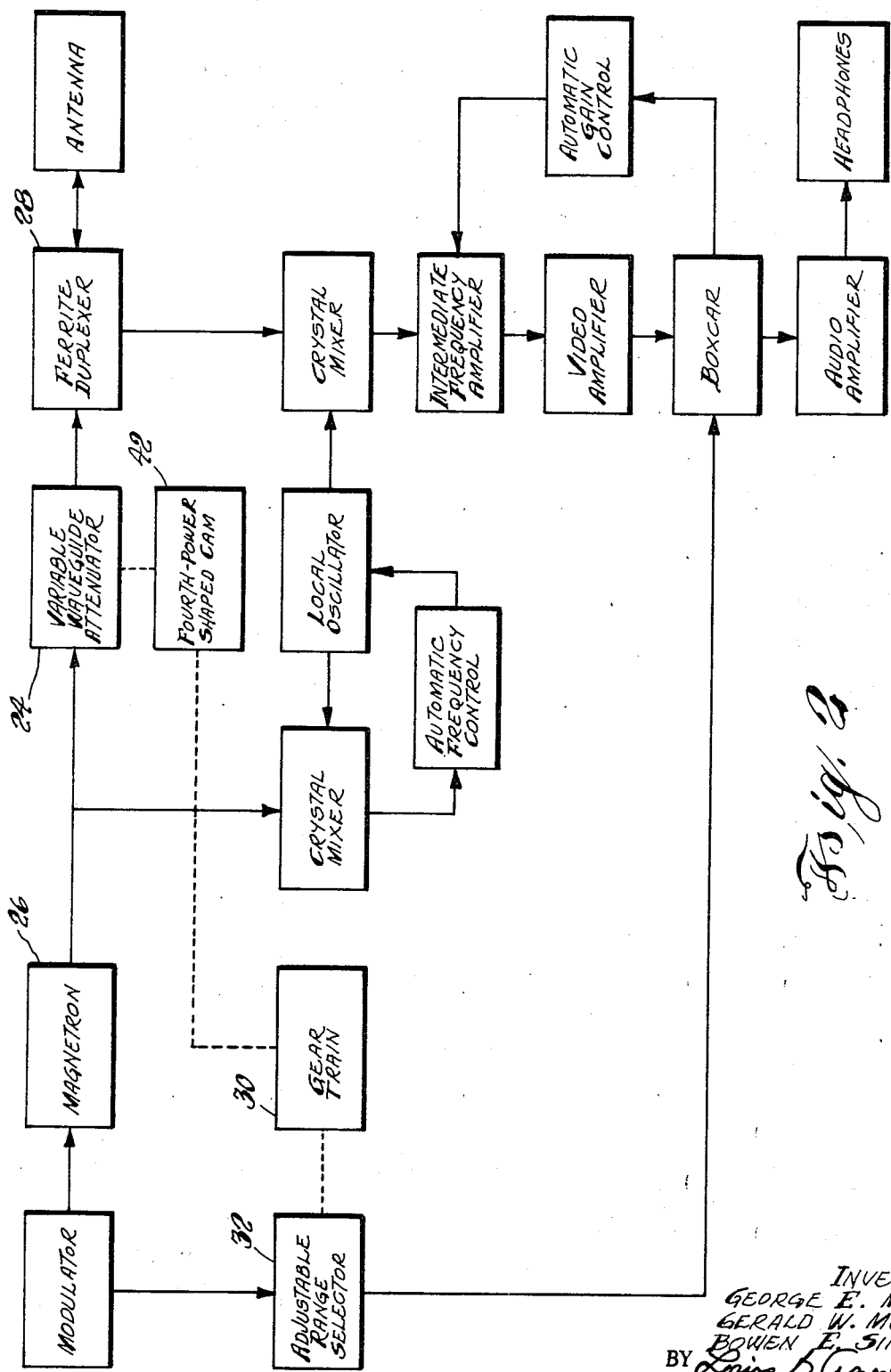
FIG. 2 is a block diagram of an embodiment of a hardened sentry radar system.

In these equations:

$R_o$=the crossover detection range
$R$=the range to the target
$\sigma$=cross-section of the target, here understood to be the non-coherent Doppler cross-section
$G$=gain of the radar antenna
$G_L$=gain of the listener antenna
$P_{nR}$=power-to-noise ratio of the radar
$P_{nL}$=power-to-noise ratio of the listener
$\lambda$=wavelength of the frequency at which the radar is operating
$P$=transmitted power of the radar
$G(\theta)$=antenna gain of the radar at an azimuthal angle $\theta$ with respect to the beam center
$G_L(\theta)_L$=antenna gain of the listener at an azimuthal angle $\theta_L$ with respect to the beam center Varying the broadcast power of the radar in proportion to the fourth power of the radar-to-target range keeps the broadcast power at the minimal level necessary to detect the target. Various means for accomplishing this result are known. A good method is illustrated in FIG. 2. This figure shows the components of an MTI sentry radar to which a variable waveguide attenuator 24 has been added between the magnetron 26 and the duplexer 28. The attenuator 24 is mechanically coupled through a gear train 30 to the range helipot of the adjustable range selector 32.

A type of variable waveguide attenuator which can be employed with this invention is shown in FIG. 3. An attenuation flap 34 is pivotably mounted atop a section of waveguide 36 which contains a slot into which the flap 34 can be rotated. The flap 34 consists of a section 38 of ground glass coated with aquadag solution and an end section 40 of high attenuation resistance card following the aquadag section.

Exemplary dimensions for the waveguide attenuator are:

waveguide length approximately 1 foot;
slot in waveguide approximately ⅛ inch wide;
ground glass approximately 1/16 inch thick;
ground glass section approximately 4+½ inches long;
resistance card section approximately ¾ inch long.

The fourth-power characteristic for the attenuator is obtained by suitably shaping a mechanical cam 42 which is coupled to the linear range helipot through the gear train 30 and which controls the depth of penetration of the attenuator flap 34 into the waveguide slot. For example, the angle of rotation of the cam 42 may vary linearly with the angle of rotation of the shaft of the range helipot and the radius of the cam 42 may vary as the fourth power of the angle of rotation. If the periphery of the cam 42 is employed to force a spring-biased attenuator flap into the waveguide slot with maximum depth of penetration at the minimum angle of rotation, the power to the antenna will vary in accordance with the fourth power of the range. Other suitable means for varying the radar output power may alternatively be employed.

Since the hardened power is high enough to detect a slowly walking man, it is, of course, more than sufficient to detect vehicles. Vehicles can be detected with less power since they have larger cross-sections than personnel and usually have larger velocities thereby providing higher Doppler frequencies which are easier for the human ear to sense.

Obviously many modifications and variations of the present invention are possible in the light of the above teachings. It is therefore to be understood that within the scope of the appended claims the invention may be practiced otherwise than as specifically described.

We claim:

1. A method for preventing detection of a given sentry radar by a given listener receiver while allowing the bearer of said given listening receiver to be detected by said sentry radar comprising the steps of:
   adjusting the sentry radar to transmit the minimal power required to detect a slowly moving person at a predetermined range;
   adjusting the transmitted power of the sentry radar to vary as the fourth power of the range; and
   maintaining the transmitted power of the sentry radar below the value required for detection of the slowly moving target at the crossover range.

2. A method for preventing detection of a given sentry radar by a given listener receiver while allowing the bearer of said given listening receiver to be detected by said sentry radar comprising the steps of:
   adjusting the sentry radar to transmit the minimal power required to detect a slowly moving person at a predetermined range;
   adjusting the transmitted power of the sentry radar to vary as the fourth power of the range;
   determining the crossover range of the given sentry radar-listener receiver combination; and
   maintaining the transmitted power of the sentry radar below the value required for detection of the slowly moving target at the crossover range.

References Cited

UNITED STATES PATENTS

| | | | |
|---|---|---|---|
| 2,442,695 | 6/1948 | Koch | 343—17.1 |
| 2,530,418 | 11/1950 | Alvarez | 343—7.5 |

RODNEY D. BENNETT, Primary Examiner

M. F. HUBLER, Assistant Examiner

U.S. Cl. X.R.

343—7.5, 7.7